(12) United States Patent
Wada

(10) Patent No.: US 8,144,772 B2
(45) Date of Patent: Mar. 27, 2012

(54) MOVING PICTURE PROCESSOR, METHOD FOR PROCESSING A MOVING PICTURE, AND COMPUTER PROGRAM PRODUCT FOR EXECUTING AN APPLICATION FOR A MOVING PICTURE PROCESSOR

(75) Inventor: Takahisa Wada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1756 days.

(21) Appl. No.: 11/368,666

(22) Filed: Mar. 7, 2006

(65) Prior Publication Data
US 2006/0203915 A1  Sep. 14, 2006

(30) Foreign Application Priority Data

Mar. 7, 2005 (JP) ................................. P2005-062954

(51) Int. Cl.
*H04N 11/04* (2006.01)
(52) U.S. Cl. .................. 375/240.15; 375/240; 375/160; 375/240.24
(58) Field of Classification Search ............. 375/240.16, 375/240.24
See application file for complete search history.

(56) References Cited

U.S. PATENT DOCUMENTS

| | | | | |
|---|---|---|---|---|
| 4,691,230 A | * | 9/1987 | Kaneko et al. | 348/699 |
| 5,089,887 A | * | 2/1992 | Robert et al. | 348/699 |
| 5,754,699 A | * | 5/1998 | Sugahara | 382/233 |
| 5,852,630 A | * | 12/1998 | Langberg et al. | 375/219 |
| 6,192,077 B1 | * | 2/2001 | Sugiyama | 375/240.12 |
| 6,714,236 B1 | * | 3/2004 | Wada et al. | 348/152 |
| 2004/0247031 A1 | * | 12/2004 | Hagai et al. | 375/240.16 |
| 2005/0105620 A1 | * | 5/2005 | Fukushima | 375/240.16 |
| 2005/0207663 A1 | * | 9/2005 | Zeng et al. | 382/236 |

FOREIGN PATENT DOCUMENTS

| | | |
|---|---|---|
| JP | 58-85684 | 5/1983 |
| JP | 5-236455 | 9/1993 |
| JP | 8-79767 | 3/1996 |
| JP | 2000-115776 | 4/2000 |
| JP | 2000-278696 | 10/2000 |
| JP | 2001-78197 | 3/2001 |
| JP | 2004-180044 | 6/2004 |

* cited by examiner

*Primary Examiner* — Shuwang Liu
*Assistant Examiner* — Helene Tayong
(74) *Attorney, Agent, or Firm* — Oblon, Spivak, McClelland, Maier & Neustadt, L.L.P.

(57) ABSTRACT

A moving picture processor including an evaluator configured to evaluate whether terminal points of motion vectors consecutively detected in a current picture and a reference picture different from the current picture in terms of time are in a determination area having a center at a terminal point of a reference vector. A unifier is configured to unify a group of motion vectors consecutively evaluated to be in the determination area, and to reset the motion vector evaluated to be outside the determination area as the reference vector.

19 Claims, 12 Drawing Sheets

MOVING PICTURE PROCESSOR, METHOD FOR PROCESSING A MOVING PICTURE, AND COMPUTER PROGRAM PRODUCT FOR EXECUTING AN APPLICATION FOR A MOVING PICTURE PROCESSOR

CROSS REFERENCE TO RELATED APPLICATION AND INCORPORATION BY REFERENCE

This application is based upon and claims the benefit of priority from prior Japanese Patent Application P2005-062954 filed on Mar. 7, 2005; the entire contents of which are incorporated by reference herein.

BACKGROUND OF THE INVENTION

1. Field of the Invention

The present invention relates to a moving picture processor, a method for processing a moving picture, a computer program product for executing an application for a moving picture processor, capable of correcting the variations of motion vectors.

2. Description of the Related Art

In recent years, the international standardization of picture coding has been rapidly pursued. Picture coding schemes include joint photographic experts group (JPEG) which stands is a still picture coding standard; H.263 and H.264, which are moving picture coding standards for communication media; and moving picture experts group (MPEG) which is moving picture coding standards for storage media. In each coding scheme, a coding algorithm is employed for realizing a bit rate (transmission rate) that serves a purpose thereof. In JPEG, color data is compressed by a scheme based on Huffman coding and discrete cosine transform (DCT).

On the other hand, in moving picture compression technique such as H.263 and MPEG, generally, orthogonal transform such as DCT is used for the spatial reduction of the amount of information as in JPEG, and motion compensation (MC) is used for the temporal reduction of the amount of information. General MC is performed by executing inter-frame prediction using a motion vector, i.e., compensating the amount of motion between a current picture and a reference picture.

Further, at the time of the detection of a motion vector, in a search area set in the reference picture, block matching is performed which detects a block that gives a minimum for an evaluation function such as the sum of absolute differences (SAD) from a target block of the current picture. The motion vector refers to a vector indicating the horizontal and vertical relative positions between a target block of the current picture for which motion is to be detected and a block of the reference picture that is most similar to the target block.

On the other hand, in the case where consecutive blocks equally move by translation or the like, the respective motion vectors of the consecutive blocks are equal. However, variations occur in motion vectors for the following reasons (1) to (3) and the like:

(1) In block matching, motion vectors are detected based on only the result of an operation using an evaluation function. Accordingly, in the case where errors such as white noise are included in pictures, variations occur in the detected motion vectors.

(2) Generally, the amount of motion of a substance in a picture is not an integer multiple of a pixel. Accordingly, in the case of processing in units of macroblocks, the amount of motion of each macroblock is approximated to an integer multiple of one pixel, a half pixel, a quarter pixel, or the like. As a result, variations due to approximation occur in the motion vectors.

(3) If block matching is used in the case where a picture has a flat figure, the case where a pattern is repeated, or the like, a similar different portion is apt to be matched. Similarly, in the case where a similar pattern accidentally exists in another portion, there is a possibility that the another portion may be matched.

Therefore, a technique has been known in which a post-filter for smoothing motion vectors is connected to the output of a motion vector calculator in order to correct variations in motion vectors. However, because of the use of the post-filter, there is a possibility that information on original motion may be lost in the case where a region in which motion changes abruptly exists in a picture, the case where a moving object is small, or the like. As related art for maintaining information on original motion, a technique has been proposed in which characteristics of a post-filter are switched based on the state of distribution of motion vectors.

On the other hand, when consecutive motion vectors are identical, the amount of code relating to motion vectors cant be reduced. However, in the above-described related art, slight variations prevent the amount of code relating to motion vectors from being reduced. In particular, in the case of a high compression rate, the amount of code relating to motion vectors becomes dominant in the total amount of code, and compression efficiency is decreased. Further, there also arise problems such as the one that block noise is tends to be pronounced when motion vectors differ between adjacent macroblocks.

SUMMARY OF THE INVENTION

An aspect of the present invention inheres in a moving picture processor encompassing, an evaluator configured to evaluate whether terminal points of motion vectors consecutively detected in a current picture and a reference picture different from the current picture in terms of time are in a determination area having a center at a terminal point of a reference vector, and a unifier configured to unify a group of motion vectors consecutively evaluated to be in the determination area, and to reset the motion vector evaluated to be outside the determination area as the reference vector.

Another aspect of the present invention inheres in a method for processing a moving picture encompassing, evaluating whether terminal points of motion vectors consecutively detected in a current picture and a reference picture different from the current picture in terms of time are in a determination area having a center at a terminal point of a reference vector, resetting the motion vector evaluated to be outside the determination area as the reference vector, and unifying a group of motion vectors consecutively evaluated to be in the determination area.

Still another aspect of the present invention inheres in a computer program product for executing an application for a moving picture processor, the computer program product encompassing, instructions configured to evaluate whether terminal points of motion vectors consecutively detected in a current picture and a reference picture different from the current picture in terms of time are in a determination area having a center at a terminal point of a reference vector, instructions configured to reset the motion vector evaluated to be outside the determination area as the reference vector, and instructions configured to unify a group of motion vectors consecutively evaluated to be in the determination area.

DETAILED DESCRIPTION OF THE INVENTION

Figure 1:
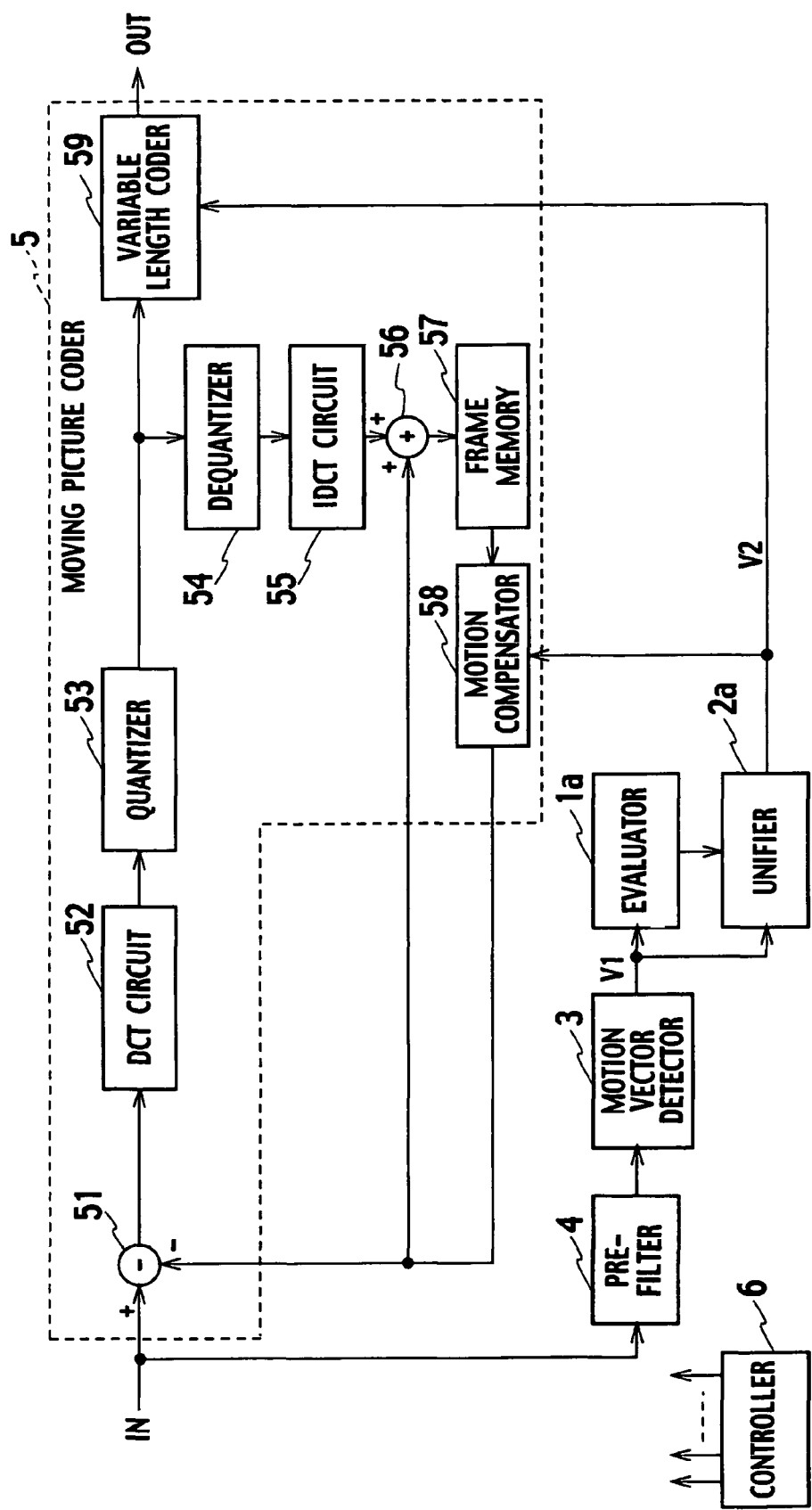
FIG. 1 is a block diagram showing an arrangement of a moving picture processor according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether there is a physical connection between the elements.

First Embodiment

As shown in FIG. 1, a moving picture processor according to a first embodiment of the present invention includes a moving picture coder 5, a pre-filter 4, a motion vector detector 3, an evaluator 1a, a unifier 2a, and a controller 6. In the example shown in FIG. 1, a moving picture coder that conforms to the MPEG standards is shown as the moving picture coder 5. As picture data IN supplied to the moving picture coder 5, for instance, a luminance signal is supplied in units of frames. A pre-filter 4 corrects frequency characteristics of the picture data IN in order to prevent a detection error of a motion vector. The motion vector detector 3 finds a motion vector V1 based on picture data (hereinafter referred to as a "current picture") of a current frame and picture data (hereinafter referred to as a "reference picture") of a frame different from that of the current picture in terms of time. Here, the "motion vector" refers to a vector indicating the horizontal and vertical relative positions between a target block in the current picture for which a motion vector is to be detected and a target block in the reference picture which is similar to the foregoing detection target block. The motion vector detector 3 divides the current picture into a plurality of blocks, and detects a motion vector V1 for each of the plurality of blocks. The evaluator 1a sequentially evaluates whether the terminal points of the motion vectors V1 are in a determination area with its center at the terminal point of a reference vector. The unifier 2a resets as a reference vector a motion vector V1 evaluated not to be in the determination area, and unifies a group of motion vectors consecutively evaluated to be in the determination area into one motion vector.

Further, the motion vector detector 3 detects motion vectors V1 by a pattern matching method, a gradient method, a phase correlation method, or the like. A "pattern matching method" is a technique for detecting blocks for which an evaluation function such as the SAD takes on a minimum value in the current picture and the reference picture, respectively. It should be noted that the mean square error (MSE) or the mean absolute deviation (MAD) between pixels at the same relative position may be used as an evaluation function used for a matching calculation between a detection target block of the current picture and the reference picture.

Figure 2:
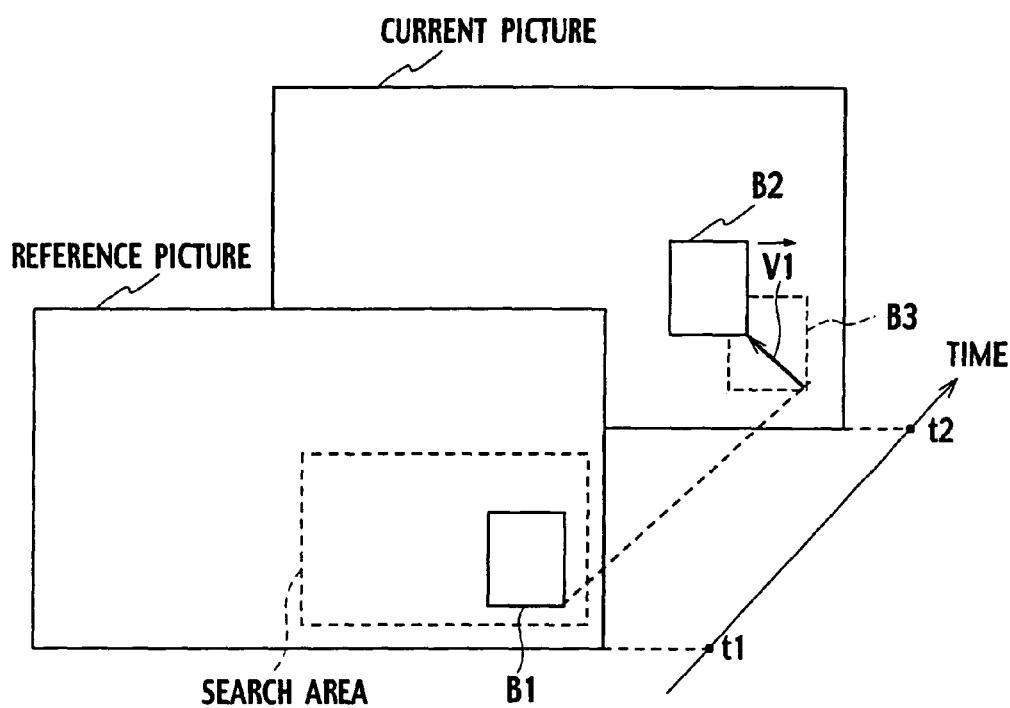
FIG. 2 is a schematic diagram for explaining a function of a motion vector generator according to the first embodiment of the present invention.

For example, in the case where a motion vector of a detection target block B2 in the current picture shown in FIG. 2 is detected, a search area is first set in the reference picture, and a block B1 most similar to the detection target block B2 is detected in the search area by pattern matching. As a result, the relative position of the detection target block B2 with respect to the block B1 in the reference picture is detected as a motion vector V1. It should be noted that block matching is performed in units of macroblocks which are each a 16-by-16 pixel square area in the current picture, sub-macroblocks which are each obtained by dividing a macroblock, or blocks which are each obtained by further dividing a sub-macroblock. A "gradient method" is a technique for improving the detection accuracy of a motion vector using an initial deviation vector. A motion vector V1 is detected in units of, for instance, integer pixels, half pixels, or quarter pixels.

Figure 3:
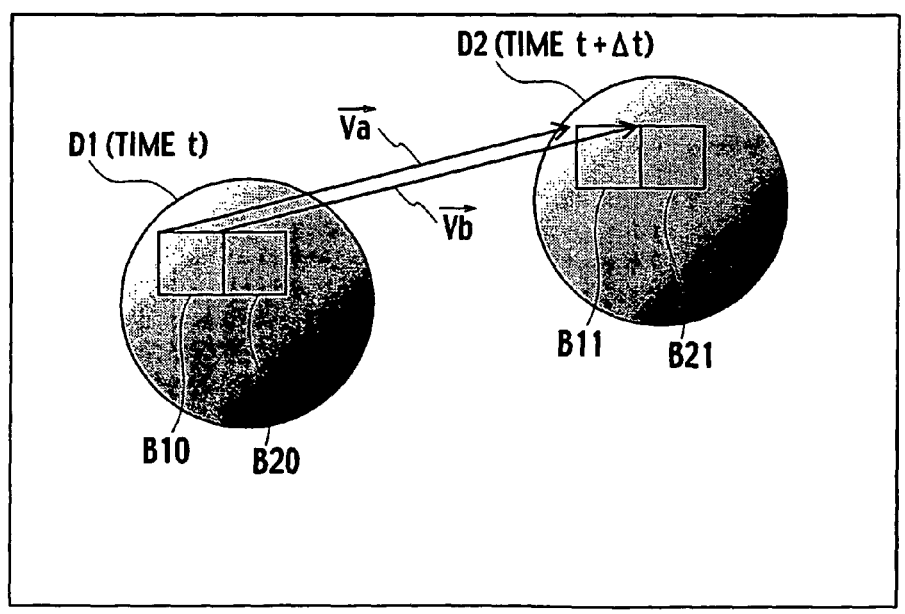
FIG. 3 is a schematic diagram for explaining a function of a motion vector generator according to the first embodiment of the present invention.

In the case where a figure D1 at time "t" moves to the position of a figure D2 at Dt after time "t" as shown in FIG. 3, a motion vector Va of a block B11 in the figure D2 with respect to a block B10 in the figure D1 theoretically coincides with a motion vector Vb of a block B21 in the figure D2 with respect to a block B20 in the figure D1. However, there is a possibility that errors may occur in the motion vectors Va and Vb for the above-described reason and that the motion vectors Va and Vb may become different vectors. The evaluator 1a and the unifier 2a shown in FIG. 1 correct errors occurring in the motion vectors Va and Vb and unify the motion vectors Va and Vb into the same motion vector.

Figure 4:
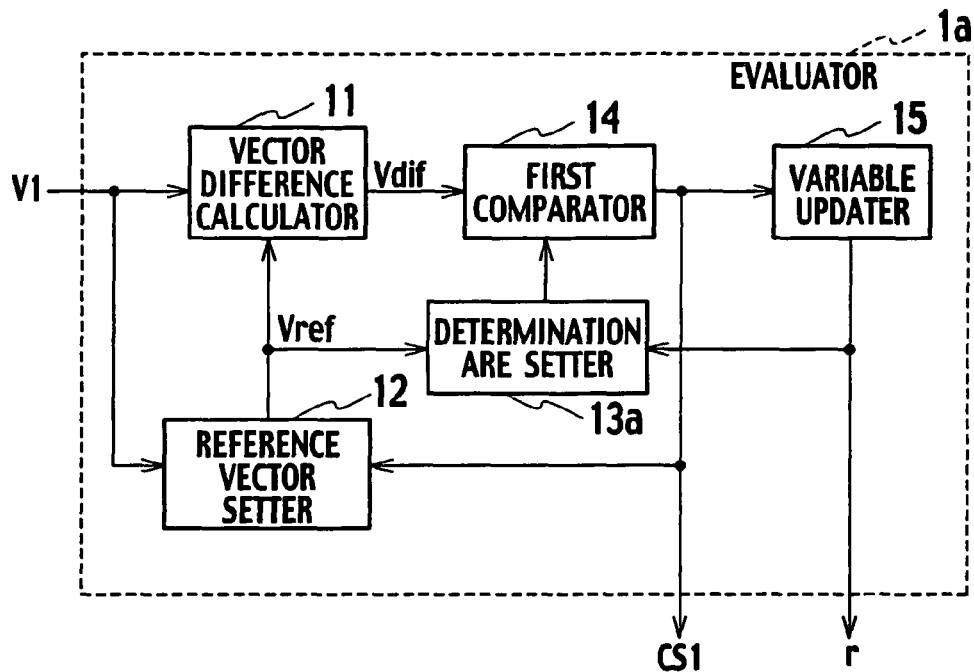
FIG. 4 is a block diagram showing an arrangement of an evaluator according to the first embodiment of the present invention.

The evaluator 1a includes a vector difference calculator 11, a first comparator 14, a variable updater 15, a reference vector setter 12, and a determination area setter 13a, as shown in FIG. 4. An input of the vector difference calculator 11 is connected to an output of the motion vector detector 3 shown in FIG. 1. An input of the reference vector setter 12 is connected to each output of the motion vector detector 3 and the first comparator 14. An input of the determination area setter 13a is connected to each output of the variable updater 15 and the reference vector setter 12. An input of the first comparator 14 is connected to each output of the vector difference calculator 11 and the determination area setter 13a. An input of the variable updater 15 is connected to an output of the first comparator 14.

Figure 5:
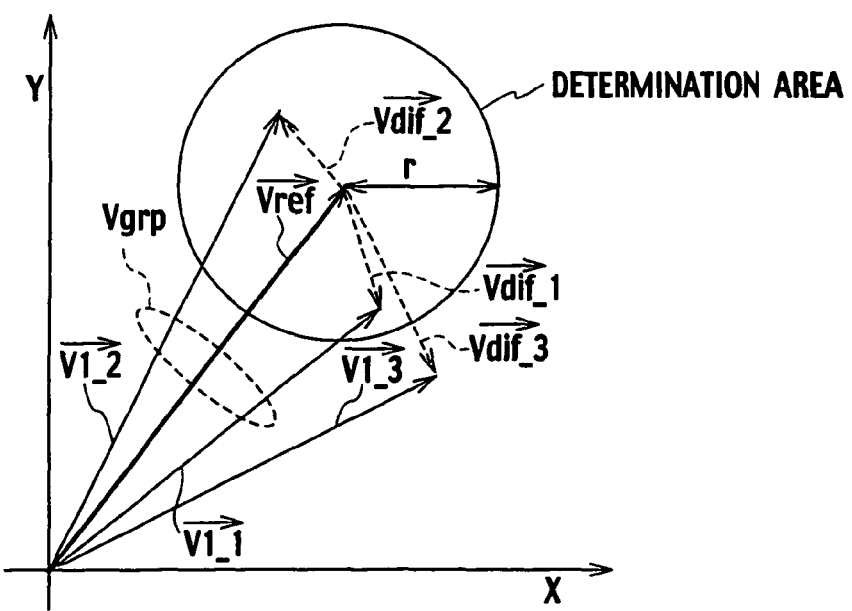
FIG. 5 is a schematic diagram for explaining a function of the evaluator and a unifier according to the first embodiment of the present invention.

The reference vector setter 12 sets the motion vector V1 detected in a first block of the current picture as a reference vector Vref in a vector difference calculator 11 and a determination area setter 13a. For example, a reference vector Vref such as shown in FIG. 5 is set in the vector difference calculator 11 and the determination area setter 13a. The vector difference calculator 11 generates a difference vector Vdif by calculating the difference between the reference vector Vref and a motion vector V1 supplied from the motion vector detector 3. As one example, as shown in FIG. 5, the vector difference calculator 11 calculates three difference vectors Vdif1, Vdif2, and Vdif3 from three motion vectors V1_1, V1_2, and V1_3 sequentially supplied from the motion vector detector 3, respectively.

The determination area setter 13a sets a determination area with its center at the terminal point of the reference vector Vref corresponding to, for instance, a variable r supplied from the variable updater 15, as shown in FIG. 5. In the example shown in FIG. 5, the determination area has a circular shape having the variable r as a radius. A first comparator 14 compares the difference vector Vdif calculated by the vector difference calculator 11 with the determination area, and determines whether the terminal point of the difference vector Vdif is in the determination area. In FIG. 5, the first comparator 14 determines that the difference vectors Vdif1 and Vdif2 are in the determination area and that the difference vector Vdif3 is outside the determination area. The variable updater 15, for instance, decreases the value of the variable r stepwise when the difference vector Vdif is in the determination area. As a result, the shape of the determination area decreases stepwise, whereby the evaluation of a difference vector Vdif gradually becomes tighter. On the other hand, when the difference vector Vdif is outside the determination area, the variable updater 15 resets the value of the variable r to an initial value r. As a result, a determination is made as to whether the motion vector V1 is in the determination area, i.e., whether the motion vector V1 is in the vicinity of the reference vector Vref.

Figure 6:
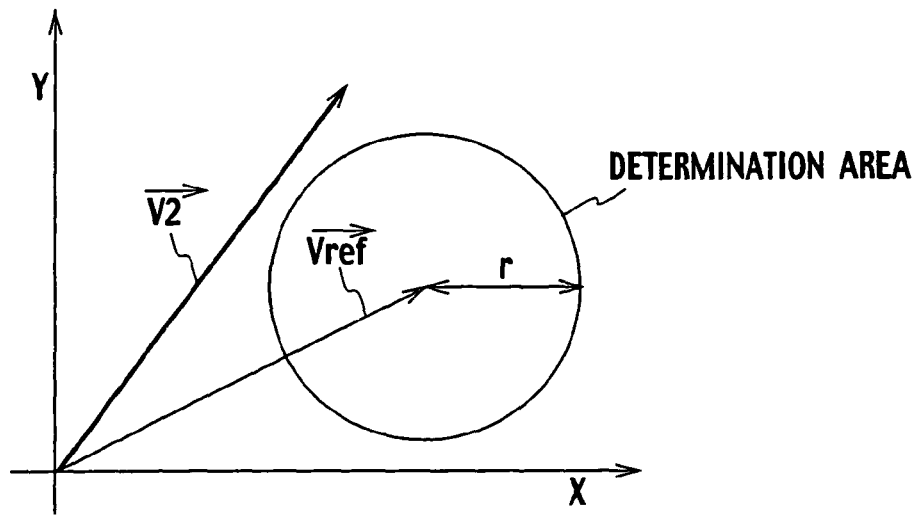
FIG. 6 is a schematic diagram for explaining a function of the evaluator and a unifier according to the first embodiment of the present invention.

The reference vector setter 12 maintains the reference vector Vref when the difference vector Vdif is in the determination area, or resets the reference vector Vref when the difference vector Vdif is outside the determination area. In the example shown in FIG. 5, the motion vector V1_3 is outside the determination area. Accordingly, as shown in FIG. 6, the motion vector V1_3 is set as a new reference vector Vref in the vector difference calculator 11 and the determination area setter 13a. As a result, the reference vector Vref is set to a vector adapted for the amount of motion of a detection target block.

Figure 7:
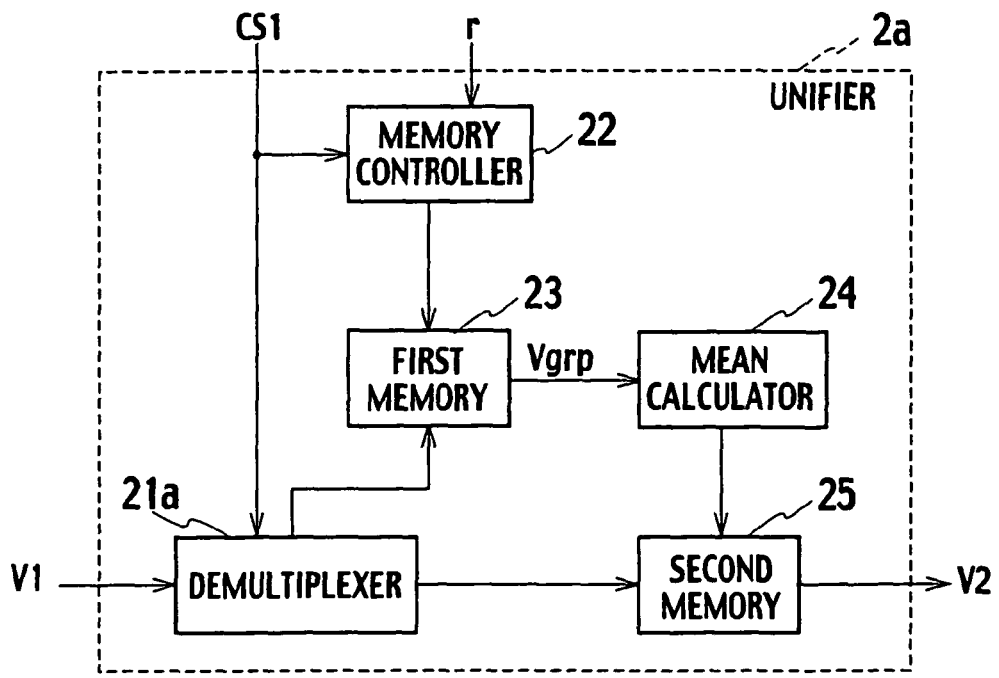
FIG. 7 is a block diagram showing an arrangement of the unifier according to the first embodiment of the present invention.

As shown in FIG. 7, the unifier 2a includes a demultiplexer 21a, a memory controller 22, a mean calculator 24, a first memory 23, and a second memory 25. An input of the demultiplexer 21a is connected to each output of the motion vector detector 3 shown in FIG. 1 and the first comparator 14 shown in FIG. 4. An input of the memory controller 22 is connected to each output of the first comparator 14 and the first comparator 14 shown in FIG. 4. An input of the first memory 23 is connected to each output of the demultiplexer 21a and the memory controller 22. An input of the mean calculator 24 is connected to an output of the first memory 23. An input of the second memory 25 is connected to each output of the demultiplexer 21a and the mean calculator 24.

The demultiplexer 21a transmits to the first memory 23 or the second memory 25 the motion vector V1 supplied from the motion vector detector 3 shown in FIG. 1 corresponding to a comparison result CS1 by the first comparator 14 shown in FIG. 4. Specifically, when the difference vector Vdif calculated by the vector difference calculator 11 shown in FIG. 4 is in the determination area set by the determination area setter 13a, the demultiplexer 21a transmits the motion vector V1 to the first memory 23. On the other hand, when the difference vector Vdif is outside the determination area, the demultiplexer 21a transmits the motion vector V1 to the second memory 25. The memory controller 22 reads a motion vector group Vgrp stored in the first memory 23 corresponding to the variable r updated by the variable updater 15 and the comparison result CS1 by the first comparator 14.

In the case where the difference vector Vdif is outside the determination area, the memory controller 22 reads the motion vector group Vgrp stored in the first memory 23. When reading the motion vector group Vgrp, the memory controller 22 compares the value of the variable r with a constant value to determine whether the variable r is a value near the initial value R. When the variable r is a value near the initial value R, a fixed number of last motion vectors of the stored motion vector group Vgrp are read as samples. The nearness of the variable r to the initial value R means that motion vectors capable of being unified have not been consecutively detected. That is, this is because motion vectors V1 are not concentrated on the reference vector Vref. Accordingly, in order to select motion vectors V1 away from the reference vector Vref, a fixed number of last motion vectors of the stored motion vector group Vgrp are read as samples to be transmitted to a mean calculator 24.

Meanwhile, when the variable r is far away from the initial value R, the memory controller 22 reads a fixed number of first motion vectors of the stored motion vector group Vgrp as samples. The farness of the variable r from the initial value R means that motion vectors V1 capable of being unified have been consecutively detected. That is, motion vectors V1 are considered to be concentrated on the reference vector Vref. Accordingly, in order to select stored motion vectors V1 in the vicinity of the reference vector Vref, a fixed number of first motion vectors of the stored motion vector group Vgrp are read as samples to be transmitted to the mean calculator 24.

By selecting an averaging method based on the distribution of a group of motion vectors to be unified as described above, motion vectors can be unified into a motion vector nearer to the amounts of motion of blocks than in the case of a method in which motion vectors are simply averaged. Alternatively, unification may be executed by selecting any one motion vector from the stored motion vector group Vgrp without averaging the stored motion vector group Vgrp.

Further, the mean calculator 24 calculates a mean of the read motion vector group Vgrp and transmits the mean to the second memory 25. It should be noted that the present invention is not limited to the case where the read motion vector group Vgrp is simply averaged and that the read motion vector group Vgrp may be averaged after weighting. The second memory 25 supplies motion vectors V2 for one frame of the current picture to the moving picture coder 5 shown in FIG. 1.

Furthermore, the moving picture coder 5 codes the value of the difference between the current picture and a reference local decode signal (hereinafter referred to as a "predicted picture") which has been motion-compensated using the motion vector V2 transmitted by the second memory 25 shown in FIG. 7.

The moving picture coder 5 includes a subtractor 51, a DCT circuit 52, a quantizer 53, a dequantizer 54, an inverse discrete cosine transform (IDCT) circuit 55, a variable length coder 59, an adder 56, a frame memory 57, and a motion compensator 58.

The subtractor 51, the DCT circuit 52, the quantizer 53, and the variable length coder 59 are connected in this order. An input of the dequantizer 54 is connected to an output of the quantizer 53. An input of the IDCT circuit 55 is connected to an output of the dequantizer 54. An input of the adder 56 is connected to an output of the IDCT circuit 55, and another input is connected to an output of the motion compensator 58. An input of the frame memory 57 is connected to an output of the adder 56. An input of the motion compensator 58 is connected to each output of frame memory 57 and the second memory 25 shown in FIG. 7.

The DCT circuit 52 performs a perpendicular conversion for a difference value from the subtractor 51. The DCT is one of Fourier transform for transforming two dimensions picture into two dimensions frequency. As a result, the difference value is separated a low frequency component and a high frequency component. The quantizer 53 quantizes the difference value after the perpendicular conversion, and transmits it to the variable length coder 59 and the dequantizer 54. The variable length coder 59 performs a variable length coding for the converted difference value.

A reference local decode signal is generated by the dequantizer 54, the IDCT circuit 55, the adder 56, and the frame memory 57. The motion compensator 58 performs motion compensation on the reference local decode signal using a motion vector. It should be noted that prediction methods include forward prediction which is prediction from a past picture, backward prediction which is prediction from a future picture, and bidirectional prediction which is prediction from past and future pictures.

The variable length coder 59 encodes the motion vector V2 for one frame stored in the second memory 25. Here, the variable length coder 59 encodes the value of the difference between motion vectors obtained from adjacent blocks of the current picture. Since the evaluator 1*a* and the unifier 2*a* shown in FIG. 1 can correct motion vectors with high accuracy, variations do not occur in the motion vectors. Accordingly, the value of the difference between motion vectors calculated by the variable length coder 59 is minimized. As a result, the amount of code of a code string generated by the variable length coder 59 is greatly reduced.

Figure 8:
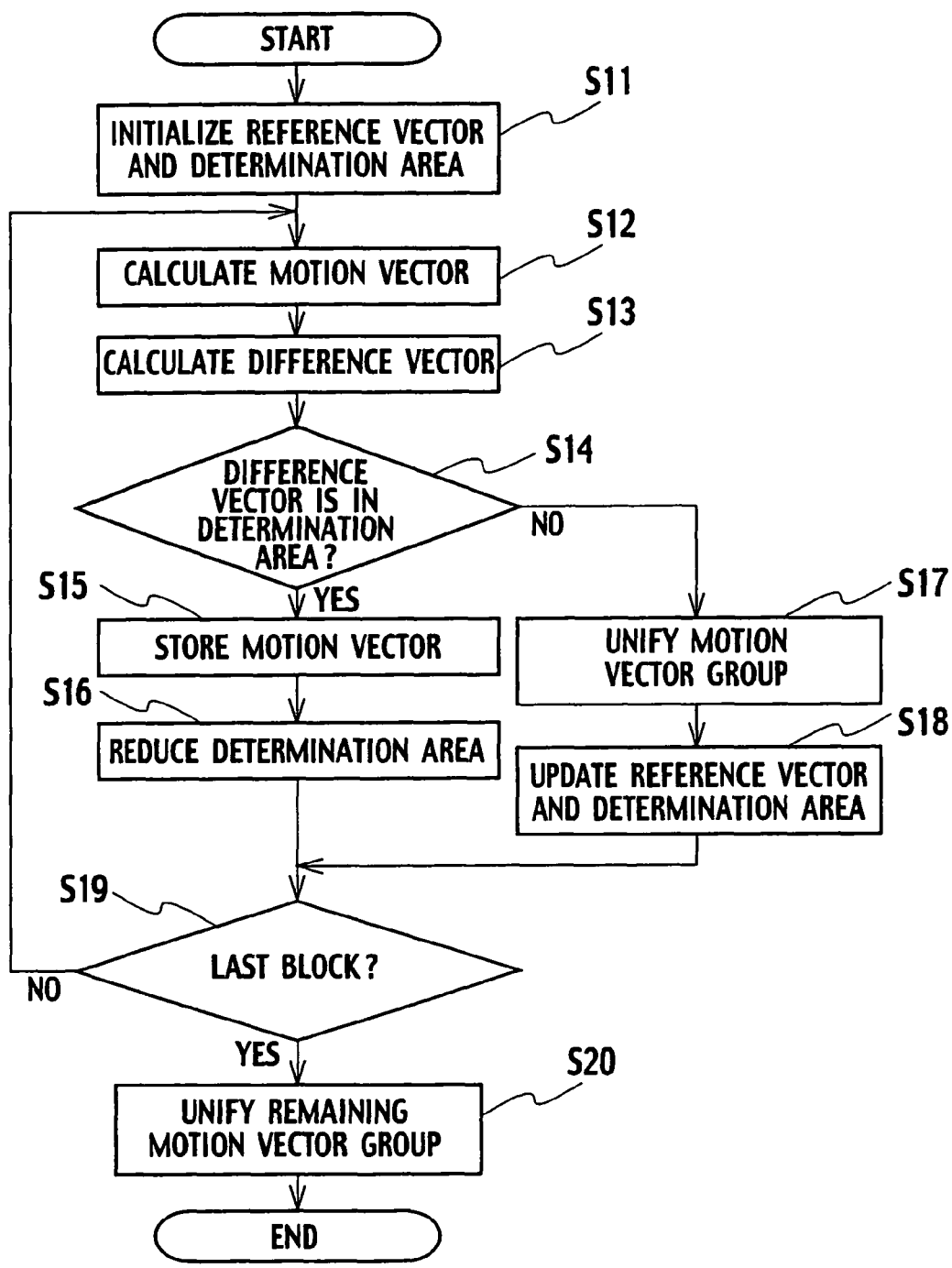
FIG. 8 is a flow chart showing a method for processing a moving picture according to the first embodiment of the present invention.

Nest, a method for processing a moving picture according to a first embodiment will be described by referring a flow chart of FIG. 8.

In step S11, when the picture data IN is transmitted to the moving picture processor shown in FIG. 1, the controller 6 initializes the reference vector setter 12 and the variable updater 15 shown in FIG. 4.

In step S12, the motion vector detector 3 sequentially detects motion vector V1 from the picture data IN transmitted via the pre-filter 4. Furthermore, in step S13, the vector difference calculator 11 calculates the difference vector Vdif between the motion vector V1 and the reference vector Vref.

In step S14, the first comparator 14 compares the difference vector Vdif with the determination area, and determines whether the difference vector Vdif is in the determination area. When it is determined that the difference vector Vdif is in the determination area, the procedure goes to step S15. When it is determined that the difference vector Vdif is not in the determination area, the procedure goes to step S17.

In step S15, the demultiplexer 21*a* shown in FIG. 7 transmits the motion vector V1 to the first memory 23. The motion vector V1 is stored in the first memory 23. In step S16, the variable updater 15 reduces the determination area by decreasing the variable r. That is, the variable updater 15 keeps the shape of the determination area reducing when the motion vector V1 capable of unifying is sequentially detected. On the other hand, the reference vector setter 12 maintains the preceding reference vector without updating the reference vector Vref. When the motion vector V1 is stored, and the variable r is updated, the procedure goes to step S19.

In step S17, the memory controller 22 reads the motion vector group Vgrp out of the first memory 23, and supplies the read motion vector group Vgrp to the mean calculator 24. The mean calculator 24 unifies the motion vector group Vgrp by averaging the motion vector group Vgrp. In step S18, the reference vector setter 12 updates the reference vector Vref. The variable updater 15 initializes the variable r to the initial value R.

In step S19, the controller 6 determines whether a target block of the current picture is the last block of a frame. When it is determined that the target block of the current picture is the last block of a frame, the procedure goes to step S20. When it is determined that the target block of the current picture is not the last block of a frame, the procedure returns to step S20. In step S20, the remaining motion vector group capable of unifying is unified.

As described above, corresponding to the first embodiment, motion vectors detected in adjacent blocks in a current picture can be unified into the same motion vector. This makes it possible to greatly reduce the amount of code relating to motion vectors in a code string generated by a variable length coder 59 shown in FIG. 1. As a result, it is possible to solve the problem that the amount of code relating to the motion vectors becomes dominant in the case of a high compression rate and that compression efficiency is decreased. Also, it is possible to solve the problem that block noise is tends to be pronounced when motion vectors differ between adjacent macroblocks.

Meanwhile, a motion vector of a block belonging to a region having a different motion vector which has been determined to be incapable of being unified into the same motion vector as a motion vector of an adjacent block is not unified into the same motion vector as the motion vector of the adjacent block. Accordingly, motion vectors can be unified while variations in motion vectors between adjacent macroblocks are selectively excluded without losing information on motion in a region or the like in which motion changes abruptly.

First Modification of First Embodiment

Figure 9:
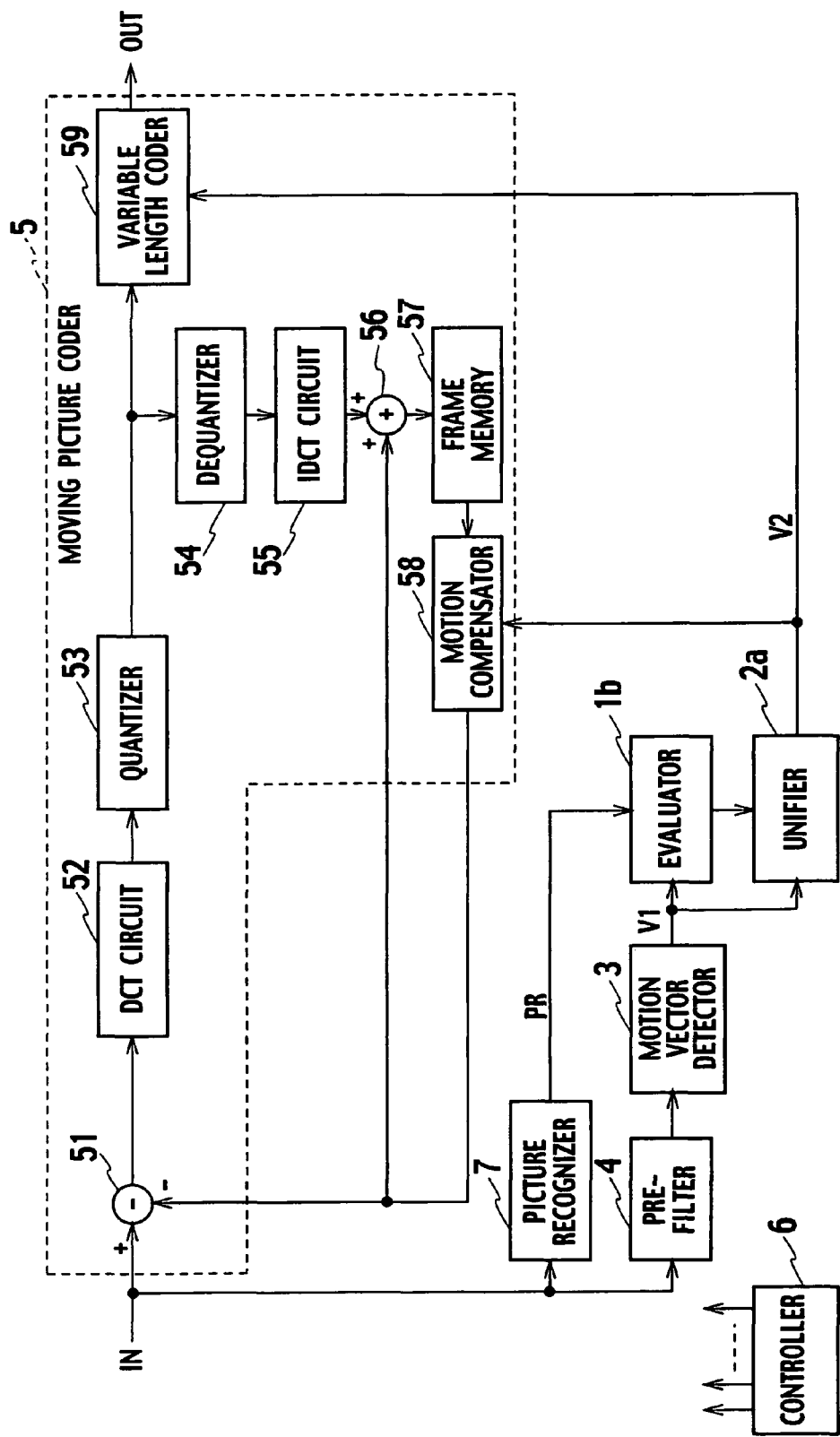
FIG. 9 is a block diagram showing an arrangement of a moving picture processor according to a first modification of the first embodiment of the present invention.
Figure 10:
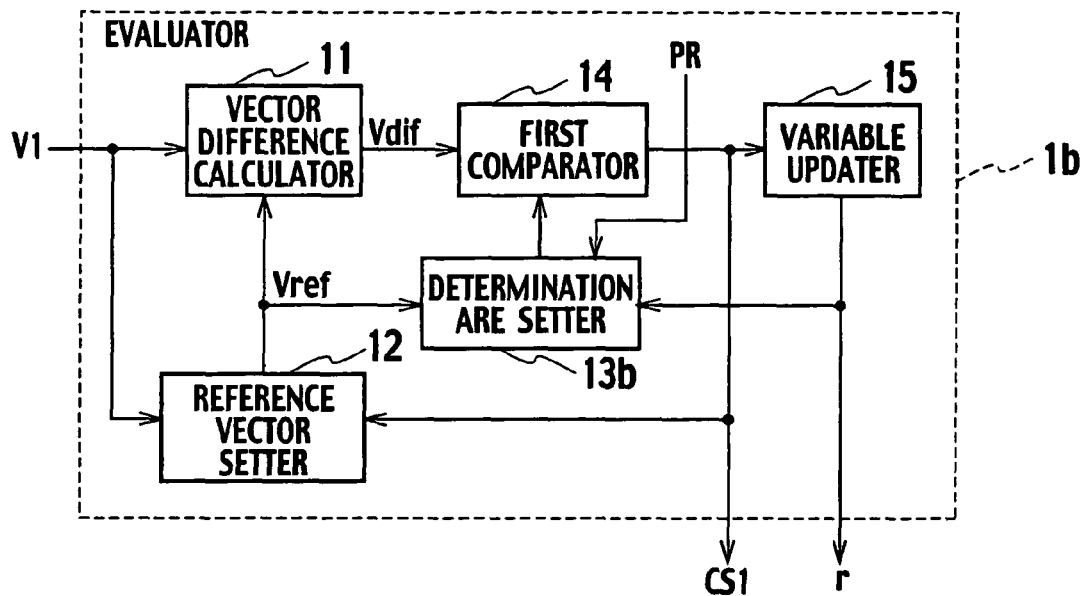
FIG. 10 is a block diagram showing an arrangement of an evaluator according to the first modification of the first embodiment of the present invention.
Figure 11:
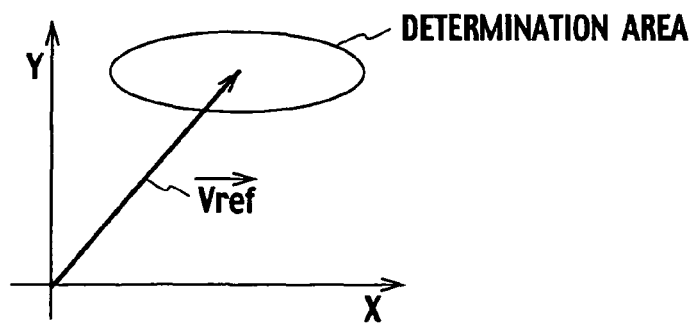
FIG. 11 is a schematic diagram for explaining a function of the evaluator according to the first modification of the first embodiment of the present invention.

As shown in FIG. 9, a moving picture processor according to a first modification of the first embodiment of the present invention further includes a picture recognizer 7 configured to recognize a figure (pattern) of the current picture. An output of the picture recognizer 7 is connected to an input of a determination area setter 13b in the evaluator 1b shown in FIG. 10. The determination area setter 13b modifies the shape of the determination area in accordance with the figure information PR from the picture recognizer 7. For example, when the current picture has a figure moving in horizontal direction, the determination area setter 13b expands the determination area in horizontal direction, as shown in FIG. 11.

Therefore, it is possible to control the accuracy of information of the motion vector, and to control so as not to unify motion vectors generated by areas having different motion. On the other hand, it is possible to control so as to unify motion vectors generated by areas having greatly different motion.

Second Modification of First Embodiment

Figure 12:
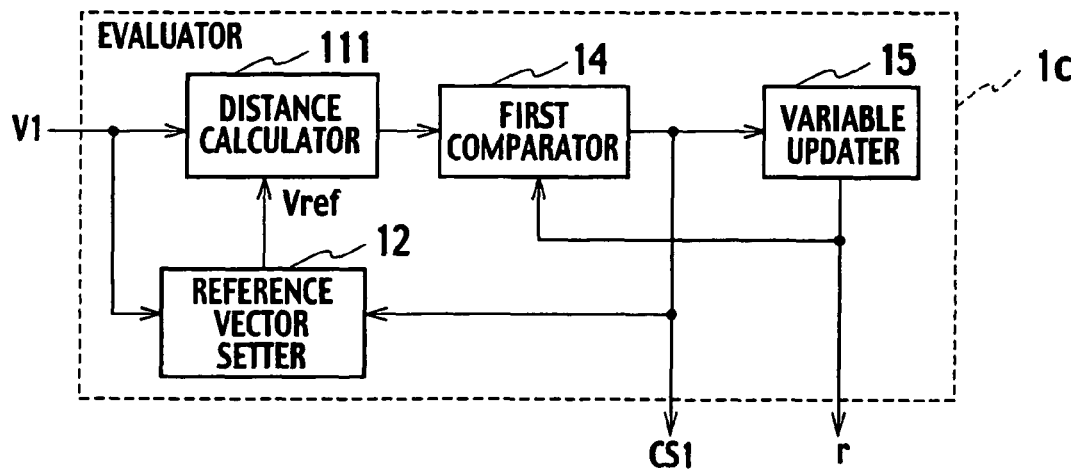
FIG. 12 is a block diagram showing an arrangement of an evaluator according to a second modification of the first embodiment of the present invention.

As shown in FIG. 12, in a moving picture processor according to a second modification of the first embodiment of the present invention, an evaluator 1c includes a distance calculator 111 configured to calculate a distance between terminal points of the motion vector V1 and the reference vector Vref, instead of the vector difference calculator 11 shown in FIG. 4. The first comparator 14 compares the calculated distance with the variable r. The evaluator 1c shown in FIG. 12 does not include the determination area setter 13a shown in FIG. 4. According to the evaluator 1c shown in FIG. 12, it is possible to achieve an estimation method shown in FIG. 5, similar to the evaluator 1a shown in FIG. 4.

Second Embodiment

Figure 13:
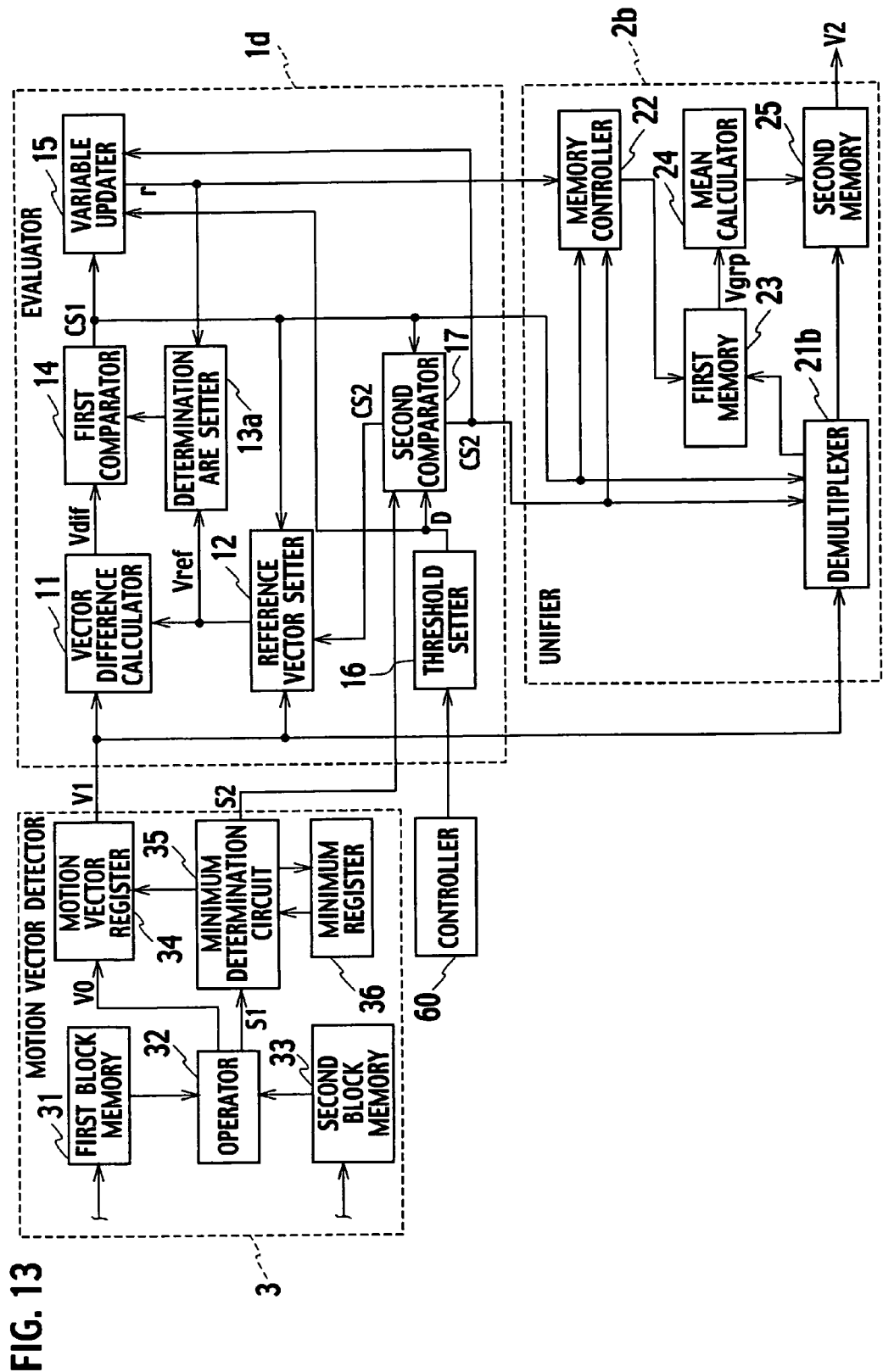
FIG. 13 is a block diagram showing an arrangement of a motion vector generator and an evaluator according to a second embodiment of the present invention.
Figure 14:
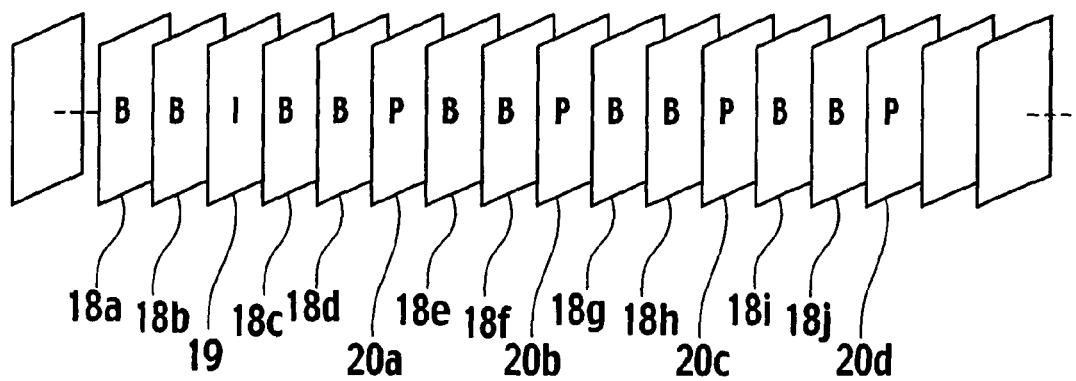
FIG. 14 is a schematic diagram for explaining a function of a threshold setter according to the second embodiment of the present invention.

As shown in FIG. 13, a moving picture processor according to the second embodiment of the present invention differs from FIG. 4 in that an evaluator 1d further includes a threshold setter 16 and a second comparator 17. The motion vector detector 3 includes a first block memory 31, an operator 32, a second block memory 33, a motion vector register 34, a minimum determination circuit 35, and minimum register 36.

The threshold setter 16 has an input connected to an output of the controller 60, and an output connected to each input of the second comparator 17 and the variable updater 15. The second comparator 17 has an input connected to each output of the threshold setter 16, the minimum determination circuit 35, and the first comparator 14, and an output connected to each input of the reference vector setter 12, the variable updater 15, the demultiplexer 21b, and the memory controller 22. Other arrangements are similar to FIG. 1, FIG. 4, and FIG. 7.

In the above-described first embodiment, even in the case where a motion vector V1 is in the determination area, there is a possibility that the motion vector V1 may be a motion vector detected in a detection target block having a motion amount different from that of an adjacent block. Accordingly, a threshold setter 16 and a second comparator 17 shown in FIG. 13 reevaluates whether the motion vector V1 is unified into the same motion vector as that of the adjacent block, using a minimum value of the evaluation function which has been used as a criterion of a determination when the motion vector V1 has been detected.

A first block memory 31 stores a detection target block of the current picture divided into a plurality of blocks. A second block memory 33 stores reference blocks sequentially cut out from a search area of the reference picture. An operator 32 performs a matching operation on the detection target block and the reference blocks using an evaluation function such as the SAD, the MSE, or the MAD. Further, the operator 32 35 sequentially calculates motion vector candidates V0 between the detection target block and the reference blocks in addition to the matching operation.

For each of the cut reference blocks, a minimum determination circuit 35 determines whether the result of the matching operation using the evaluation function shows a minimum value, and detects a reference block for which the operation result shows a minimum value. A minimum register 36 stores a minimum value candidate in a process in which the minimum determination circuit detects a minimum value. A motion vector register 34 stores a motion vector V1 between the detection target block and a reference block when the minimum determination circuit 35 detects a minimum value. As a result, the motion vector detector 3 generates a minimum value S2 of the matching operation using the evaluation function and a motion vector V1 at the time of the detection of the minimum value S2.

In the case where the difference vector Vdif is determines to be in the determination area, the second comparator 17 compares a threshold D calculated by the threshold setter 16 and the minimum value S2. The comparison result CS2 by the second comparator 17 is transmitted to the reference vector setter 12, the variable updater 15, a demultiplexer 21b, and the memory controller 22. The reference vector setter 12 updates the reference vector Vref in the case where the difference vector Vdif is in the determination area and the minimum value S2 is larger than the threshold D, in addition to the case where the difference vector Vdif is outside the determination area. The variable updater 15 initializes the variable r in the case where the difference vector Vdif is in the determination area and the minimum value S2 is larger than the threshold D, in addition to the case where the difference vector Vdif is outside the determination area.

The demultiplexer 21b transmits the motion vector V1 to the first memory 23 in the case where the difference vector Vdif is in the determination area and the minimum value S2 is not more than the threshold D. The memory controller 22 reads the motion vector group Vgrp from the first memory 23 in the case where the difference vector Vdif is in the determination area and the minimum value S2 is larger than the threshold D, in addition to the case where the difference vector Vdif is outside the determination area.

The threshold D set by the threshold setter 16 is defined by, for instance, the following formula:

$$D = \alpha/B \qquad (1)$$

where the symbol "α" represents an arbitrary constant and the symbol "B" is a variable representing the bit rate of encoded picture data OUT shown in FIG. 1. That is, the value of the threshold D is inversely proportional to the bit rate of the encoded picture data OUT. It should be noted that information on the bit rate is supplied from a controller 60 to the threshold setter 16.

Specifically, the evaluation of a motion vector V1 is relaxed in the case of a low bit rate or is performed strictly in the case of a high bit rate. In consideration of the efficiency of encoding, in the case where the bit rate is set low, when motion vectors V1 have variations, the amount of code relating to the motion vectors is increased, and encoding efficiency is decreased. Accordingly, in the case of a low bit rate, encoding efficiency is improved by increasing the number of motion vectors V1 to be unified. On the other hand, in the case of a high bit rate, motion vectors are allowed to have variations. This is because it is expected that a sufficient amount can be assigned to the amount of code relating to motion vectors in the case of a high bit rate. Accordingly, encoding efficiency can be controlled corresponding to a set bit rate.

In the case where the pre-filter 4 shown in FIG. 1 is not provided, the value of the threshold D can be represented as follows from formula (1):

$$D = \alpha/B + \beta S \qquad (2)$$

where the symbol "β" represents an arbitrary constant and the symbol "S" represents the sampling frequency of the picture data IN. That is, the value of the threshold D is proportion to the sampling frequency of the picture data IN. It should be noted that information on the sampling frequency is supplied from the controller 60 to the threshold setter 16.

Specifically, the evaluation of a motion vector V1 is performed strictly in the case of a low sampling frequency or is relaxed in the case of a high sampling frequency. When the picture data IN is down-sampled, picture data is obtained on which high-frequency components are superimposed. In the case where a motion vector V1 is detected using picture data on which high-frequency components are superimposed, there is a possibility that accurate detection may not be performed. On the other hand, in the case of a high sampling frequency, the detection accuracy of a motion vector V1 is high, and the evaluation of the motion vector V1 can therefore be relaxed.

In the case where a telescopic search is used to detect a motion vector, the threshold D is set, for instance, as follows:

$$D = \alpha/B + \gamma M \qquad (3)$$

where the symbol "γ" represents an arbitrary constant and the symbol "M" represents an interframe spacing. That is, the value of the threshold D is proportion to the interframe spacing. It should be noted that the "interframe spacing" refers to the spacing between a current picture and a predicted picture in an intraframe encoded picture (I picture) 19, interframe forward-predicted encoded pictures (P pictures) 18a to 18j, and bidirectionally-predicted encoded pictures 20a to 20d (B pictures). Information on the interframe spacing is supplied from the controller 60 to the threshold setter 16. In the case where motion vectors are searched for using a telescopic search, variations in motion vectors generally increase as the interframe spacing M increases. Accordingly, the evaluation of a motion vector V1 is relaxed in proportion to the interframe spacing M.

Figure 15:
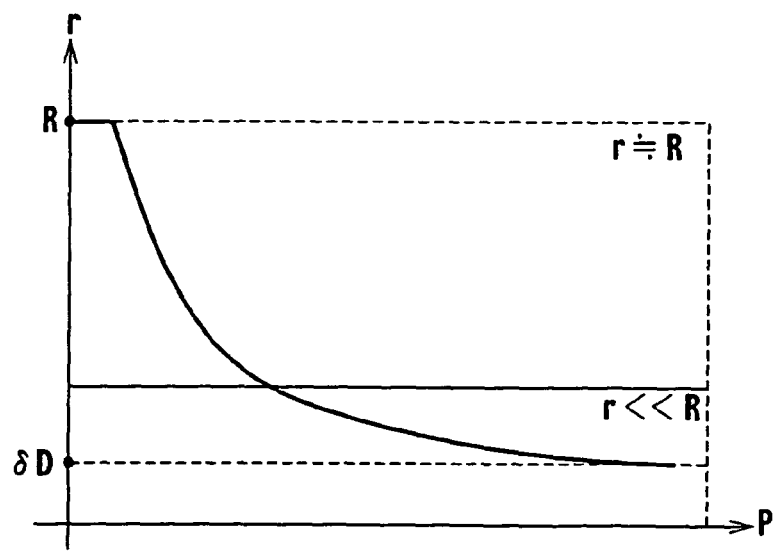
FIG. 15 is a schematic diagram for explaining a function of a variable updater according to the second embodiment of the present invention.

On the other hand, the variable updater 15 shown in FIG. 13 changes the variable r using the value of the threshold D set by the threshold setter 16. As described previously, in the case where a motion vector V1 which cannot be unified is detected, the variable r is initialized to the initial value R by the variable updater 15. In contrast, in the case where a motion vector V1 which can be unified is detected, the variable updater 15 updates the variable r. The variable r is set, for instance, as follows using the threshold D:

$$r = \epsilon/P + \delta D \qquad (4)$$

where the symbols "ε" and "δ" represent arbitrary constants and the symbol "P" represents a variable increasing in proportion to the number of consecutive motion vectors which can be unified. It should be noted, however, that the radius r for P=0, i.e., the initial value of the radius r, is set to the constant R. As shown in FIG. 15, the radius r gradually approaches δD as the variable P increases, and does not become zero.

Figure 16:
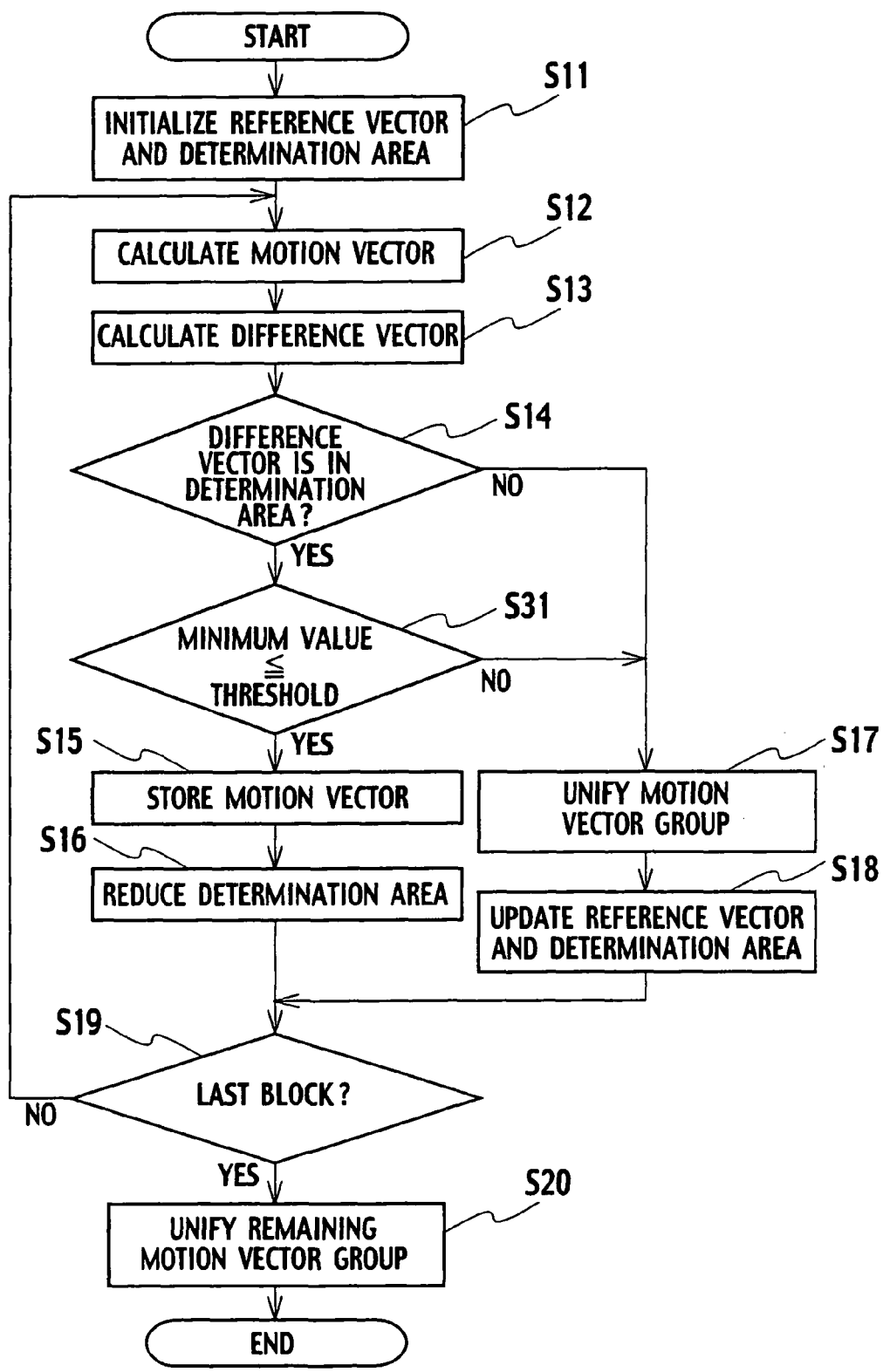
FIG. 16 is a flow chart showing a method for processing a moving picture according to the second embodiment of the present invention.

Next, a method for processing a moving picture will be described by referring a flow chart of FIG. 16. Repeated descriptions for the same processing according to the second embodiment which are the same as the first embodiment are omitted.

In step S14, the first comparator 14 shown in FIG. 13 compares the difference vector Vdif with the determination area, and determines whether the difference vector Vdif is in the determination area. When it is determined that the difference vector Vdif is in the determination area, the procedure goes to step S31. When it is determined that the difference vector Vdif is not in the determination area, the procedure goes to step S17.

In step S31, the second comparator 17 compares the minimum value S2 with the threshold D. When the minimum value S2 is less than or equal to the threshold D, the procedure goes to step S15. When the minimum value S2 is more than the threshold D, the procedure goes to step S17.

As described above, according to the second embodiment, only when a minimum value S2 of a matching operation using an evaluation function is not more than a threshold D, i.e., only when a motion vector V1 detected can be determined to be equal to the amount of motion of a block, the motion vector V1 can be unified into the same motion vector as that of an adjacent block. Accordingly, errors occurring in motion vectors V1 can be corrected and the motion vectors V1 can be unified by a method in which information held by the motion vectors V1 are not lost.

First Modification of Second Embodiment

Figure 17:
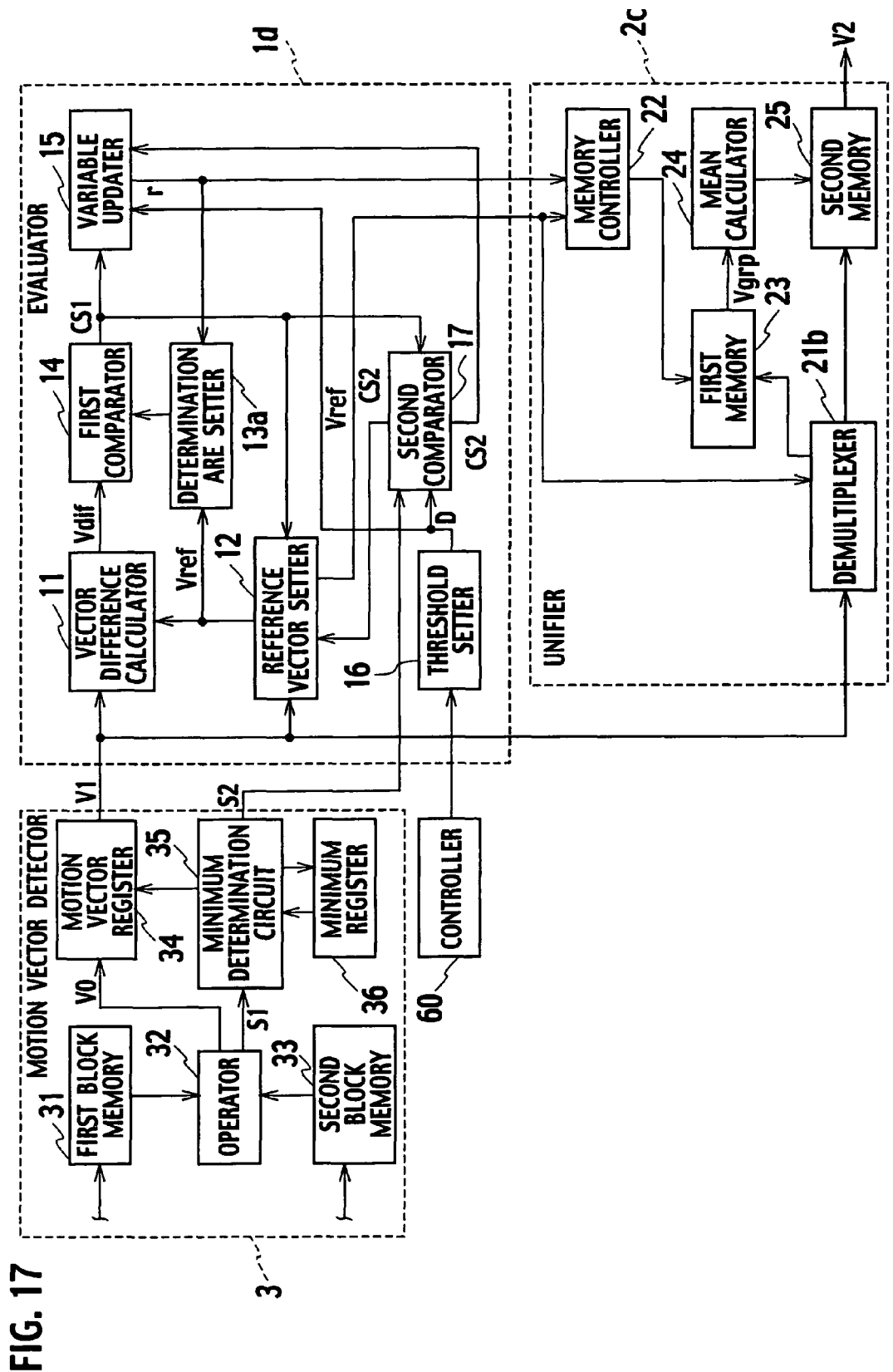
FIG. 17 is a block diagram showing an arrangement of an evaluator and a unifier according to a first modification of the second embodiment of the present invention.

As show in FIG. 17, in a moving picture processor according to a first modification of the second embodiment of the present invention, the reference vector Vref set by the reference vector setter 12 is supplied to the demultiplexer 21b and the memory controller 22 of the unifier 2c. When the reference vector Vref is updated, the demultiplexer 21b determines that the difference vector Vdif is outside the determination area, and transmits the motion vector V1 to the second memory 25. When the reference vector Vref is maintained, the demultiplexer 21b determines that the difference vector Vdif is in the determination area, and transmits the motion vector V1 to the first memory 23.

When the reference vector Vref is updated, the memory controller 22 determines that the difference vector Vdif is outside the determination area, and reads the motion vector group Vgrp out of the first memory 23. As described above, according to the moving picture processor shown in FIG. 17, it is possible to simplify respective processes of the demultiplexer 21b and the memory controller 22, compared with FIG. 13.

Second Modification of Second Embodiment

Figure 18:
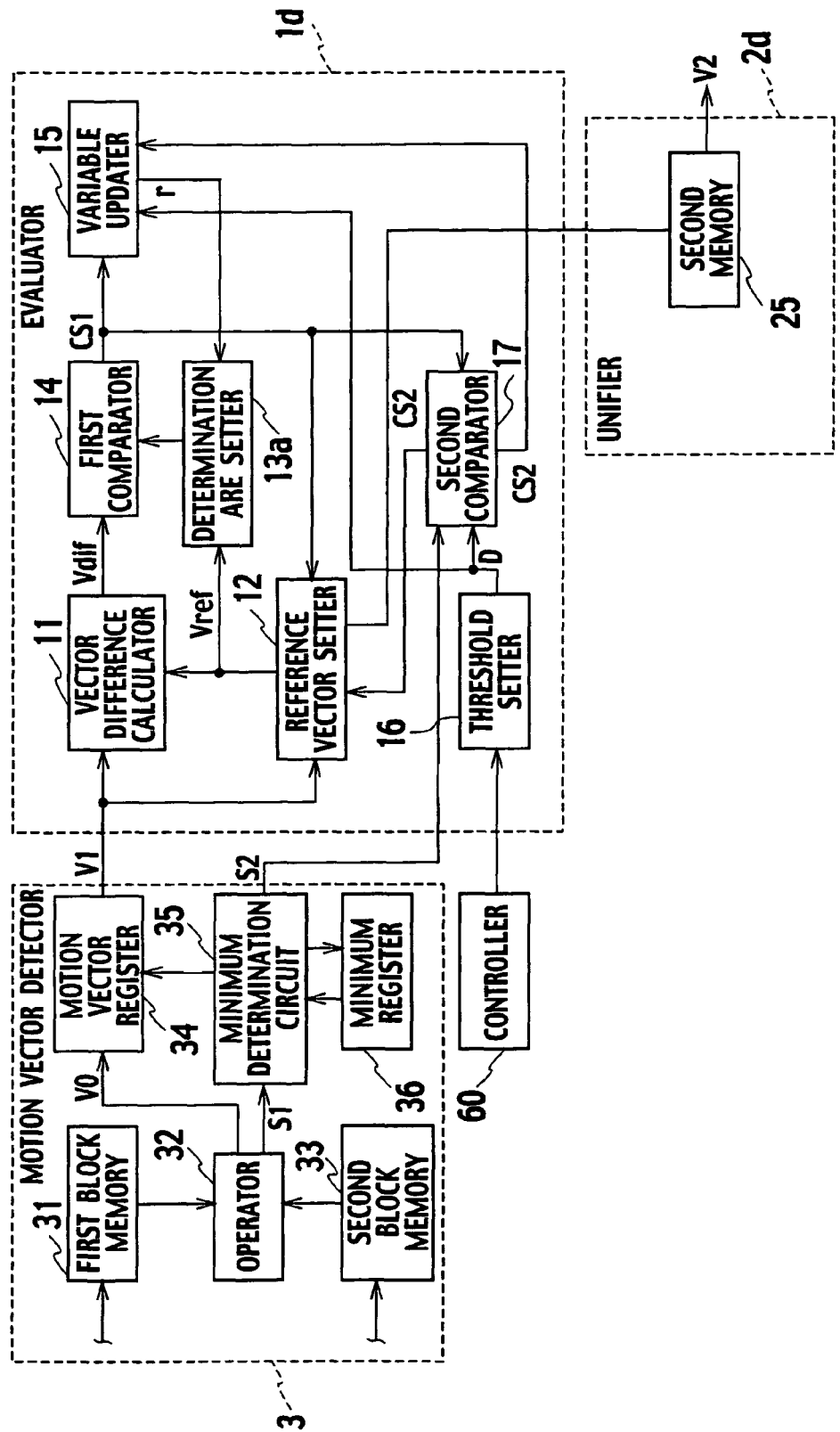
FIG. 18 is a block diagram showing an arrangement of an evaluator and a unifier according to a second modification of the second embodiment of the present invention.

As shown in FIG. 18, in a moving picture processor according to the second modification of the present invention, the unifier 2d only has a second memory 25. That is, the second memory 25 stores the reference vector Vref without storing the mean value and the motion vector V1 of the motion vector group Vgrp. According to the moving picture processor shown in FIG. 18, it is possible to greatly reduce the circuit scale of the unifier 2d.

Other Embodiments

Various modifications will become possible for those skilled in the art after receiving the teachings of the present disclosure without departing from the scope thereof.

In aforementioned first and second embodiments, the pre-filter 4, the motion vector detector 3, the evaluator 1a, and the unifier 2a are applied to the moving picture coder 5. However, the pre-filter 4, the motion vector detector 3, the evaluator 1a, and the unifier 2a may be applied to a format converter or a noise reduction device, instead of the moving picture coder 5.

In aforementioned first and second embodiments, an example has been described in which the determination area has a circular shape having the variable r as a radius. However, the shape of the determination area may have either a polygon shape, such as a rectangle shape, or a cross shape, and the like.

In aforementioned first and second embodiments, an example has been described in which the motion vector is detected by the luminance signal of the picture data SN. However, not only the luminance signal of the picture data IN but also color-difference signals may be used in the detection of the motion vector.

Furthermore, the moving picture processor shown in FIG. 1 and FIG. 9 can be formed as semiconductor integrated circuit (IC) by integrating on a semiconductor chip.

What is claimed is:

1. A moving picture processor, comprising: an evaluator configured to evaluate whether terminal points of motion vectors consecutively detected in a current picture and a reference picture different from the current picture in terms of time are in a determination area having a center at a terminal point of a reference vector; and
   a unifier configured to unify a group of motion vectors consecutively evaluated to be in the determination area, and to reset a motion vector evaluated to be outside the determination area as the reference vector;
   wherein the evaluator comprises
   a reference vector setter configured to set the motion vector evaluated to be outside the determination area as the reference vector;
   a vector difference calculator configured to execute a difference calculation between the reference vector and the motion vector, and to generate a difference vector;
   a variable updater configured to decrease or reset a value of a variable based on the difference vector;
   a determination area setter configured to set the determination area in accordance with the variable; and
   a first comparator configured to compare the difference vector with the determination area, and to determine whether a terminal point of the difference vector is in the determination area.

2. The moving picture processor of claim 1, further comprising a motion vector detector configured to detect a reference block in the reference picture, the reference block giving a minimum value for an evaluation function of a detection target block of a plurality of blocks constituting the current picture, the detection target block being a target block for which a motion vector is to be detected, and to detect a relative position difference between the reference block and the detection target block as the motion vector.

3. The moving picture processor of claim 2, wherein the evaluator is further configured to compare the minimum value with a threshold, and the unifier is further configured to unify the group of motion vectors consecutively evaluated to be in the determination area when the minimum value is less than or equal to the threshold.

4. The moving picture processor of claim 1, wherein the reference vector setter is further configured to maintain the reference vector when the difference vector is in the determination area, and update the reference vector when the difference vector is outside the determination area.

5. The moving picture processor of claim 1, wherein the variable updater is further configured to gradually decrease the variable when the difference vector is in the determination area, and reset the variable to an initial value when the difference vector is outside the determination area.

6. The moving picture processor of claim 3, wherein the evaluator comprises
   a threshold setter configured to set the threshold; and
   a second comparator configured to compare the threshold with the minimum value when the difference vector is in the determination area.

7. The moving picture processor of claim 6, wherein the reference vector setter is further configured to update the reference vector when the difference vector is in the determination area and the minimum value is more than the threshold.

8. The moving picture processor of claim 6, wherein the variable updater is further configured to initialize the variable when the difference vector is in the determination area and the minimum value is more than the threshold.

9. The moving picture processor of claim 6, wherein the threshold setter is further configured to set the threshold in accordance with a bit rate of output picture data.

10. The moving picture processor of claim 6, wherein the threshold setter is further configured to set the threshold in accordance with a sampling frequency of input picture data.

11. The moving picture processor of claim 6, wherein the threshold setter is further configured to set the threshold in accordance with spacing of frames.

12. The moving picture processor of claim 6, wherein the variable updater is further configured to update the variable by utilizing the threshold.

13. The moving picture processor of claim 6, wherein the unifier comprises
   a first memory configured to store the motion vector group;
   a memory controller configured to read the motion vector group out of the first memory in accordance with both the variable and a comparison result of the first comparator; and
   a mean calculator configured to calculate a mean value of the motion vector group.

14. The moving picture processor of claim 13, wherein the mean calculator is further configured to calculate the mean value after weighting the motion vector group.

15. The moving picture processor of claim 13, wherein the memory controller is further configured to select a method of calculation of the mean value based on a distribution of the motion vector group.

16. The moving picture processor of claim 15, wherein the memory controller is further configured to
   determine whether a difference value between the variable and an initial value is less than or equal to a fixed value,
   read out a fixed number of last motion vectors of the motion vector group as samples when the difference value is less than or equal to a fixed value, and
   read out a fixed number of first motion vectors of the motion vector group as samples when the difference value is more than the fixed value.

17. The moving picture processor of claim 1, further comprising a picture recognizer configured to recognize a figure of the current picture, wherein
the evaluator is further configured to change a shape of the determination area in accordance with the figure.

18. A method for processing a moving picture, comprising:
evaluating, by an arithmetic processor, whether terminal points of motion vectors consecutively detected in a current picture and a reference picture different from the current picture in terms of time are in a determination area having a center at a terminal point of a reference vector;
resetting a motion vector evaluated to be outside the determination area as the reference vector; and
unifying a group of motion vectors consecutively evaluated to be in the determination area;
wherein the evaluating comprises a reference vector setter setting the motion vector evaluated to be outside the determination area as the reference vector;
a vector difference calculator executing a difference calculation between the reference vector and the motion vector, and to generate a difference vector;
a variable updater configured to decrease or reset a value of a variable based on the difference vector;
a determination area setter setting the determination area in accordance with the variable; and
a first comparator comparing the difference vector with the determination area, and to determine whether a terminal point of the difference vector is in the determination area.

19. A non-transitory computer readable storage medium storing computer readable instructions thereon that, when executed by an arithmetic processor, direct the arithmetic processor to execute a method for processing a moving picture, comprising:
evaluating whether terminal points of motion vectors consecutively detected in a current picture and a reference picture different from the current picture in terms of time are in a determination area having a center at a terminal point of a reference vector;
resetting a motion vector evaluated to be outside the determination area as the reference vector; and
unifying a group of motion vectors consecutively evaluated to be in the determination area wherein the evaluating comprises
a reference vector setter setting the motion vector evaluated to be outside the determination area as the reference vector;
a vector difference calculator executing a difference calculation between the reference vector and the motion vector, and to generate a difference vector;
a variable updater configured to decrease or reset a value of a variable based on the difference vector;
a determination area setter setting the determination area in accordance with the variable; and
a first comparator comparing the difference vector with the determination area, and to determine whether a terminal point of the difference vector is in the determination area.

\* \* \* \* \*